United States Patent [19]
Meguro et al.

[11] Patent Number: 6,018,445
[45] Date of Patent: Jan. 25, 2000

[54] BELT-DRIVE TAPE CARTRIDGE HAVING AN OFFSET DRIVE ROLLER AND FLANGED TAPE GUIDES

[75] Inventors: Hiroshi Meguro; Masanori Sato, both of Miyagi, Japan

[73] Assignee: Sony Corporation, Japan

[21] Appl. No.: 08/882,269

[22] Filed: Jun. 25, 1997

[30] Foreign Application Priority Data

Jul. 2, 1996 [JP] Japan ................................ 8-171928

[51] Int. Cl.[7] .............................................. G11B 23/087
[52] U.S. Cl. ......................................... 360/132; 242/346
[58] Field of Search ........................ 360/132; 242/352.4, 242/340, 342, 341, 346, 346.2

[56] References Cited

U.S. PATENT DOCUMENTS

| | | | |
|---|---|---|---|
| 3,861,619 | 1/1975 | Wolff | 242/346.1 |
| 4,502,648 | 3/1985 | Newell | 242/346.1 |
| 5,104,058 | 4/1992 | Eggebeen | 242/346.1 |
| 5,326,044 | 7/1994 | Haller | 242/346.1 |
| 5,452,150 | 9/1995 | Henneberger et al. | 360/132 |
| 5,610,788 | 3/1997 | Standiford et al. | 360/132 |
| 5,695,143 | 12/1997 | Gerfast | 360/132 |
| 5,716,018 | 2/1998 | Begley et al. | 242/346 |
| 5,823,455 | 10/1998 | Hable et al. | 360/132 |

*Primary Examiner*—Brian E. Miller
*Attorney, Agent, or Firm*—Rader, Fishman & Grauer; Ronald P. Kananen

[57] ABSTRACT

A belt-drive tape cartridge includes tape guides arranged on both sides of a recess of a base plate for receiving a magnetic head, each tape guide having flanges formed at upper and lower ends thereof, and a drive roller arranged to be offset with respect to the center position of the base plate. A reproducing apparatus adapted to belt-drive tape cartridges includes a drive capstan roller having a diameter increased in accordance with the offset amount of the drive roller of the tape cartridge, or arranged to be offset with respect to the center position of a cartridge compartment.

5 Claims, 11 Drawing Sheets

BELT-DRIVE TAPE CARTRIDGE HAVING AN OFFSET DRIVE ROLLER AND FLANGED TAPE GUIDES

BACKGROUND OF THE INVENTION

The present invention relates to a belt-drive tape cartridge and a reproducing apparatus adapted to same.

Referring to FIG. 12, a belt-drive tape cartridge (refer hereafter to as "data cartridge") 201 comprises a base plate 202 having a front end face 202a, and a drive roller 203 arranged at the front end face 202a and in a center position $Cl_1$ of the base plate 202 as viewed in the cross direction. The base plate 202 has beside the drive roller 203 a recess 204 for receiving a magnetic head. A first tape guide 205 is arranged on one side of the recess 204 near a corner of the base plate 202, and a second tape guide 206 is arranged on another side of the recess 204 substantially in the center of the base plate 202 and adjacent to the drive roller 203.

The first tape guide 205 includes flanges 205a at the upper and lower ends thereof. The second tape guide 206, which does not include any flange at the upper and lower ends thereof, is formed like a straight pin with the diameter smaller than that of the first tape guide 205.

A reproducing apparatus 301 adapted to the data cartridge 201 comprises a drive capstan roller 303 at an inner end of a cartridge compartment 302 and in a center position $Cl_2$ thereof as viewed in the cross direction, and a magnetic head 304 arranged beside the drive capstan roller 303.

Referring to FIG. 13, when inserting the data cartridge 201 into the cartridge compartment 302 of the reproducing apparatus 301, the drive roller 203 and the drive capstan roller 303 contact each other with rotation axes aligned in the cartridge inserting direction. The magnetic head 304 introduced into the recess 204 of data cartridge 201 contacts a magnetic tape 207 thereof.

Rotation of the drive capstan roller 303 is transmitted to the drive roller 203 to rotate a drive belt 208 of the data cartridge 201, running the magnetic tape 207.

However, the conventional data cartridge 201 has the following inconveniences since the first tape guide 205 arranged on one side of the recess 204 is of the type having the flanges 205a at the upper and lower ends thereof, whereas the second tape guide 206 arranged on another side of the recess 204 is of the type having no flange and formed like a straight pin with the diameter smaller than that of the first tape guide 205:

First, on one side of the recess 204, vertical movement or off-track of the magnetic tape 207 can be restrained by the flanges 205a of the first tape guide 205 arranged at the upper and lower ends thereof, whereas, on another side of the recess 204, such off-track cannot be restrained due to the use of the straight-pin-like tape guide 206.

Restrained off-track of the magnetic tape 207 on another side of the recess 204 can be achieved by adopting as the second tape guide 206 a flanged tape guide similar to the first tape guide 205. However, if the second tape guide 206 is of the flanged type, it will contact the drive roller 203.

Second, in view of the fact that the second tape guide 206 is smaller in diameter than the first tape guide 205, if the data cartridge 201 is left inserted in the cartridge compartment 302 of the reproducing apparatus 30 during a long period of time as shown in FIG. 13, part of the magnetic tape 207 contacting the second tape guide 206 undergoes a great pressure, resulting in possible occurrence of bent streaks or pressing marks thereon.

It is, therefore, an object of the present invention to provide a data cartridge with restrained occurrence of off-track of a magnetic tape and bent streaks thereon. Another object of the present invention is to provide a reproducing apparatus adapted to the above data cartridge.

SUMMARY OF THE INVENTION

According to one aspect of the present invention, there is provided a belt-drive tape cartridge, comprising:

a base plate, said base plate having a recess for receiving a magnetic head, said base plate having a center position as viewed in a cross direction thereof;

tape guides arranged on both sides of said recess, each tape guide including flanges formed at both ends thereof; and a drive roller arranged to be offset with respect to said center position of said base plate in a direction apart from said tape guides.

Another aspect of the present invention lies in providing a reproducing apparatus for a belt-drive tape cartridge, the tape cartridge including a base plate, a magnetic tape and a drive roller arranged to be offset with respect to a center position of the base plate as viewed in a cross direction thereof, the reproducing apparatus being formed with a cartridge compartment, the reproducing apparatus comprising:

a magnetic head arranged at an inner end of the cartridge compartment, said magnetic head contacting the magnetic tape of the tape cartridge when inserting the tape cartridge into the cartridge compartment;

a drive capstan roller arranged at said inner end of the cartridge compartment, said drive capstan roller contacting the drive roller of the tape cartridge when inserting the tape cartridge into the cartridge compartment, said drive capstan roller having a diameter increased in accordance with an offset amount of the drive roller of the tape cartridge with respect to the center position of the base plate thereof.

Still another aspect of the present invention lies in providing a reproducing apparatus for a belt-drive tape cartridge, the tape cartridge including a base plate, a magnetic tape and a drive roller arranged to be offset with respect to a center position of the base plate as viewed in a cross direction thereof, the reproducing apparatus being formed with a cartridge compartment, the reproducing apparatus comprising:

a magnetic head arranged at an inner end of the cartridge compartment, said magnetic head contacting the magnetic tape of the tape cartridge when inserting the tape cartridge into the cartridge compartment;

a drive capstan roller arranged at said inner end of the cartridge compartment, said drive capstan roller contacting the drive roller of the tape cartridge when inserting the tape cartridge into the cartridge compartment, said drive capstan roller being arranged to be offset with respect to a center position of the cartridge compartment as viewed in a cross direction thereof in accordance with an offset amount of the drive roller of the tape cartridge with respect to the center position of the base plate thereof.

DETAILED DESCRIPTION OF THE INVENTION

Figure 1:
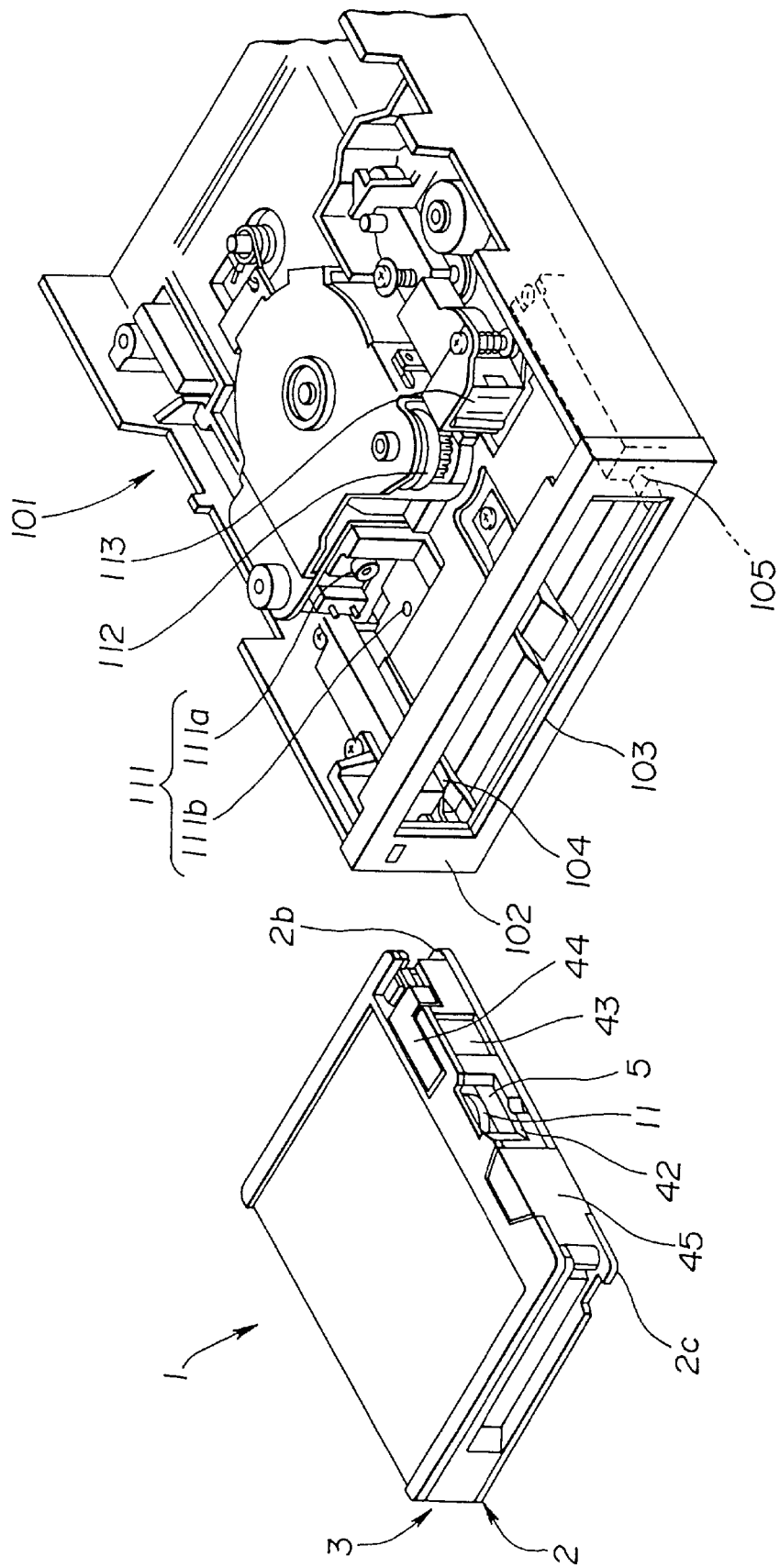
FIG. 1 is a perspective view showing a first embodiment of a data cartridge and a reproducing apparatus according to the present invention.

Referring to the drawings, preferred embodiments of a data cartridge and a reproducing apparatus will be described.

Figure 2:
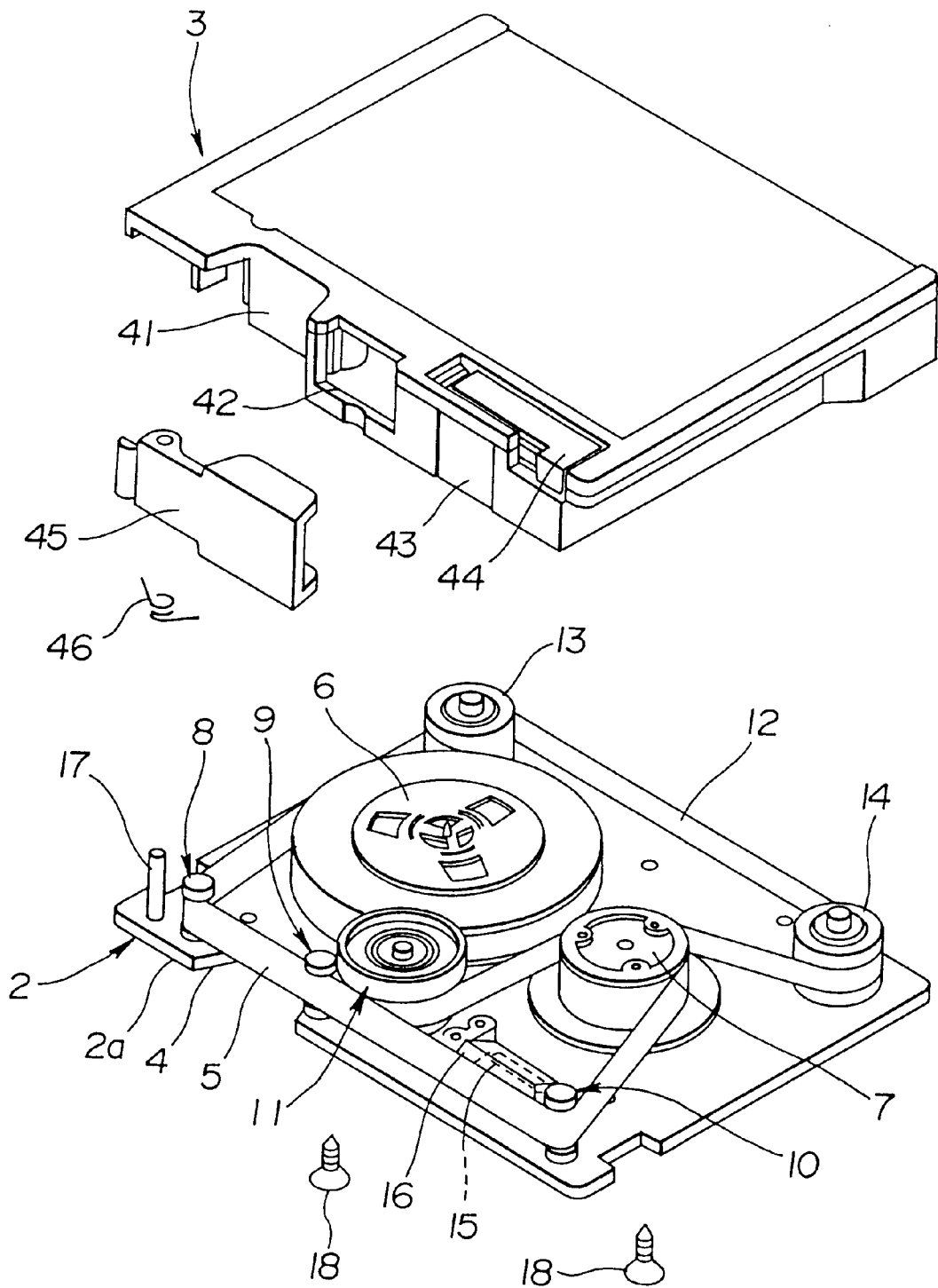
FIG. 2 is an exploded perspective view showing the data cartridge.

FIGS. 1–8 show a first embodiment of the present invention. Referring to FIG. 1, a data cartridge 1 comprises a base plate 2 made of aluminum and a cover 3 made of synthetic resin mounted thereon. Referring also to FIG. 2, the base plate 2 is formed like a rectangle, having a front end face 2a formed on one side thereof with a recess 4 for receiving a magnetic head. The base plate 2 comprises first and second reels 6, 7 for winding of a magnetic tape 5, first, second and third tape guides 8, 9, 10 for forming a tape passage through the recess 4, a drive roller 11 disposed between the second and third tape guides 9, 10, a drive belt 12 driven by the drive roller 11, a first corner roller 13 for pressing part of the drive belt 12 on the periphery of the first reel 6, a second corner roller 14 for pressing part of the drive belt 12 on the periphery of the second reel 7, a mirror or light guide 16 arranged to face an opening 15 for introducing a light for detecting a tape end, and a shaft 17 for rotatably mounting a cover 45 for closing a head compartment 41 as will be described later.

The first tape guide 8 is arranged on one side of the recess 4 of the base plate 2 and in the vicinity of one corner of the front end face 2a thereof. The second tape guide 9 is arranged on another side of the recess 4 of the base plate 2 to face the first tape guide 8. The third tape guide 10 is arranged in the vicinity of another corner of the front end face 2a of the base plate 2.

Figure 4:
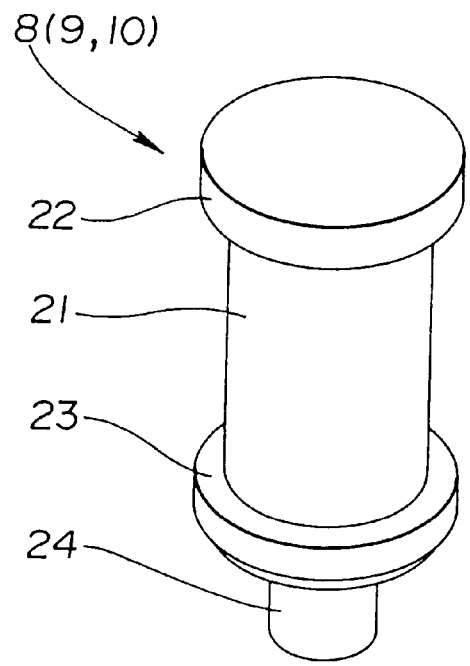
FIG. 4 is a view similar to FIG. 1, showing a tape guide of the data cartridge.

Referring to FIG. 4, each of the tape guides 8, 9, 10 includes a shank 21, upper and lower flanges 22, 23 arranged at the upper and lower ends of the shank 21, and a leg 24 arranged to a lower side of the lower flange 23, and it is mounted on the base plate 2 by press-fitting the leg 24 therein. The shank 21 is enough large in diameter to restrain occurrence of bent streaks or pressing marks on the magnetic tape 5.

Figure 3:
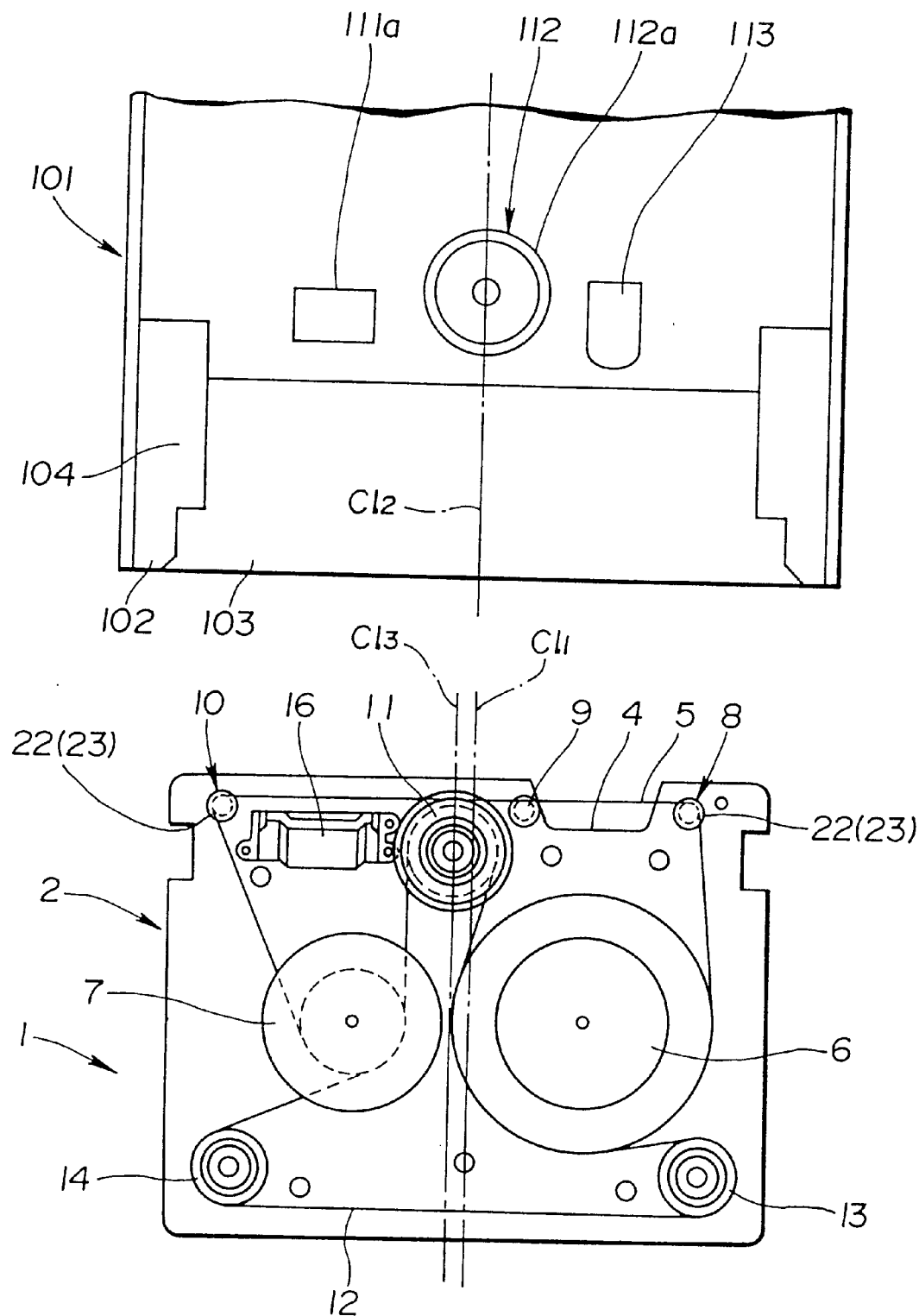
FIG. 3 is a plan view showing the data cartridge and the reproducing apparatus.
Figure 5:
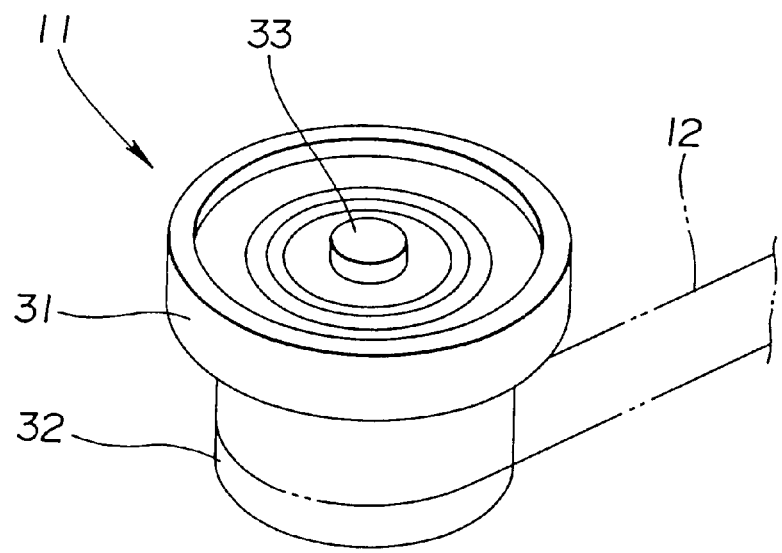
FIG. 5 is a view similar to FIG. 4, showing a drive roller of the data cartridge.

Referring to FIG. 3, in order to avoid contact with the second tape guide 8, the drive roller 11 is arranged in a position $Cl_3$ offset to the third tape guide 10 with respect to a center position $Cl_1$ of the base plate 2 as viewed in the cross direction. Referring to FIG. 5, the drive roller 11 includes a large-diameter portion 31 and a small-diameter portion 32 connected to a lower end of the large-diameter portion 31, and is rotatably mounted on the base plate 2 through a shaft 33. The drive roller 11 is constructed such that the drive belt 12 is put round the small-diameter portion 32, and a drive capstan roller 112 of a reproducing apparatus 101 as will be described later is pressed on the periphery of the large-diameter portion 31.

Referring to FIG. 2, the cover 3 is mounted on the base plate 2 by screws 18 to conceal the reels 6, 7, the tape guides 8, 9, 10, the drive roller 11, the drive belt 12, the corner rollers 12, 14, etc. The cover 3 has a front end face having one side portion formed with the head compartment 41 which corresponds to the recess 2a of the base plate 2, a center portion formed with a window 42 for exposing the large-diameter portion 31 of the drive roller 11, and another side portion formed with a window 43 which faces the tape-end detecting mirror 16. The cover 3 has an upper side on which a member 44 for preventing error erasing is slidably mounted thereon.

The cover 45 for closing the head compartment 41 of the cover 3 is rotatably mounted to the shaft 17 of the base plate 2, and is biased by a torsion coil spring 46 in the direction of closing the head compartment 41.

Next, the reproducing apparatus 101 will be described. Referring to FIG. 1, the reproducing apparatus 101 has a cartridge compartment 103 on the side of a front panel 102. Arranged on both sides of the cartridge compartment 103 are guide grooves 104, 105 which engage with sides 2b, 2c of the base plate 2 of the data cartridge 1 for guiding insertion thereof.

The reproducing apparatus 1 comprises a light receiver 111a of a photosensor 111 for detecting a tape end, the drive capstan roller 112, and a magnetic head 113 arranged at an inner end of the cartridge compartment 103; a member, not shown, for opening the cover 45 of the data cartridge 1 arranged on one side thereof; and a light emitter 111b of the photosensor 111 arranged on an bottom thereof.

Figure 12:
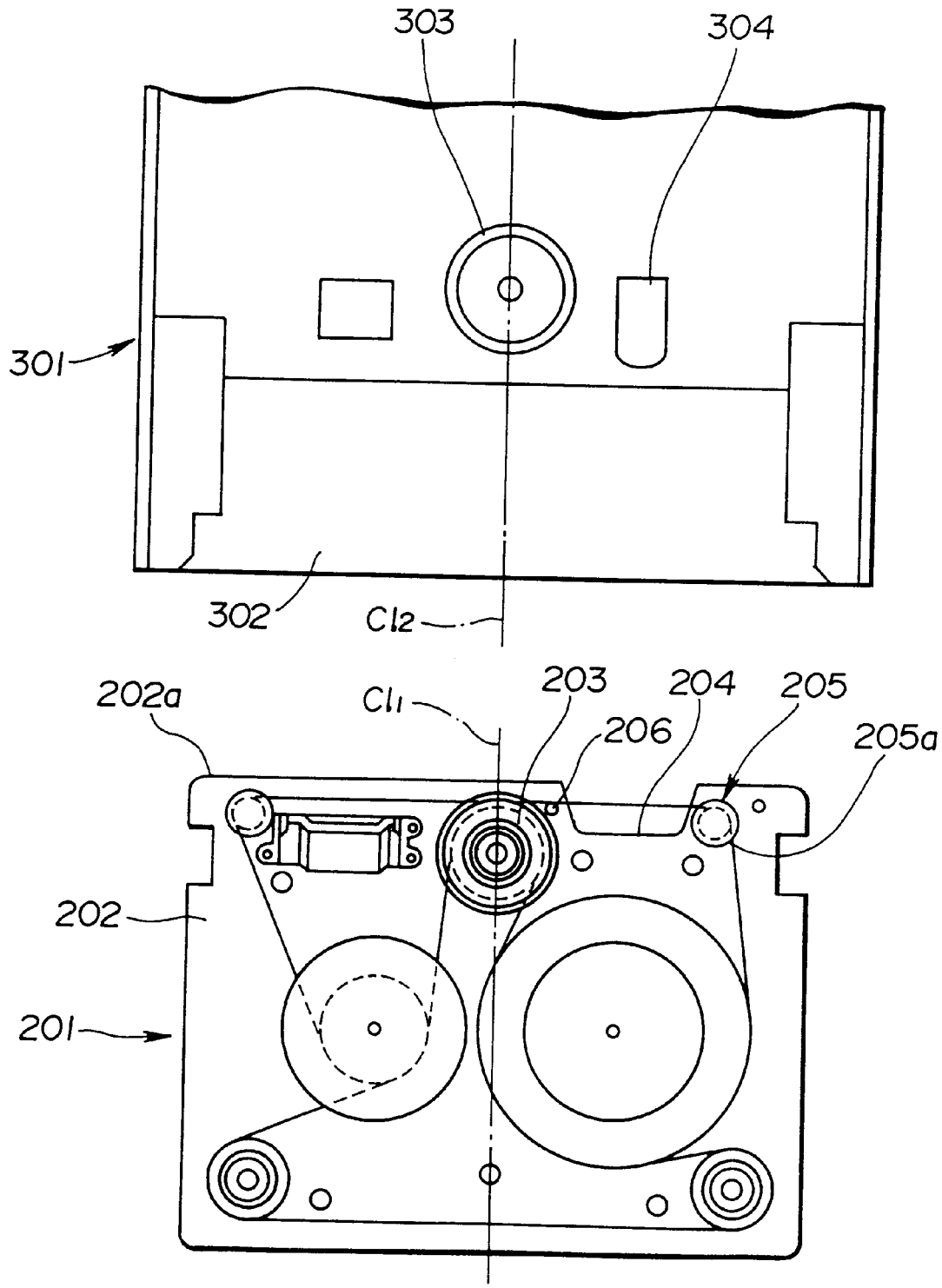
FIG. 12 is a view similar to FIG. 11, showing the known data cartridge and reproducing apparatus.
Figure 13:
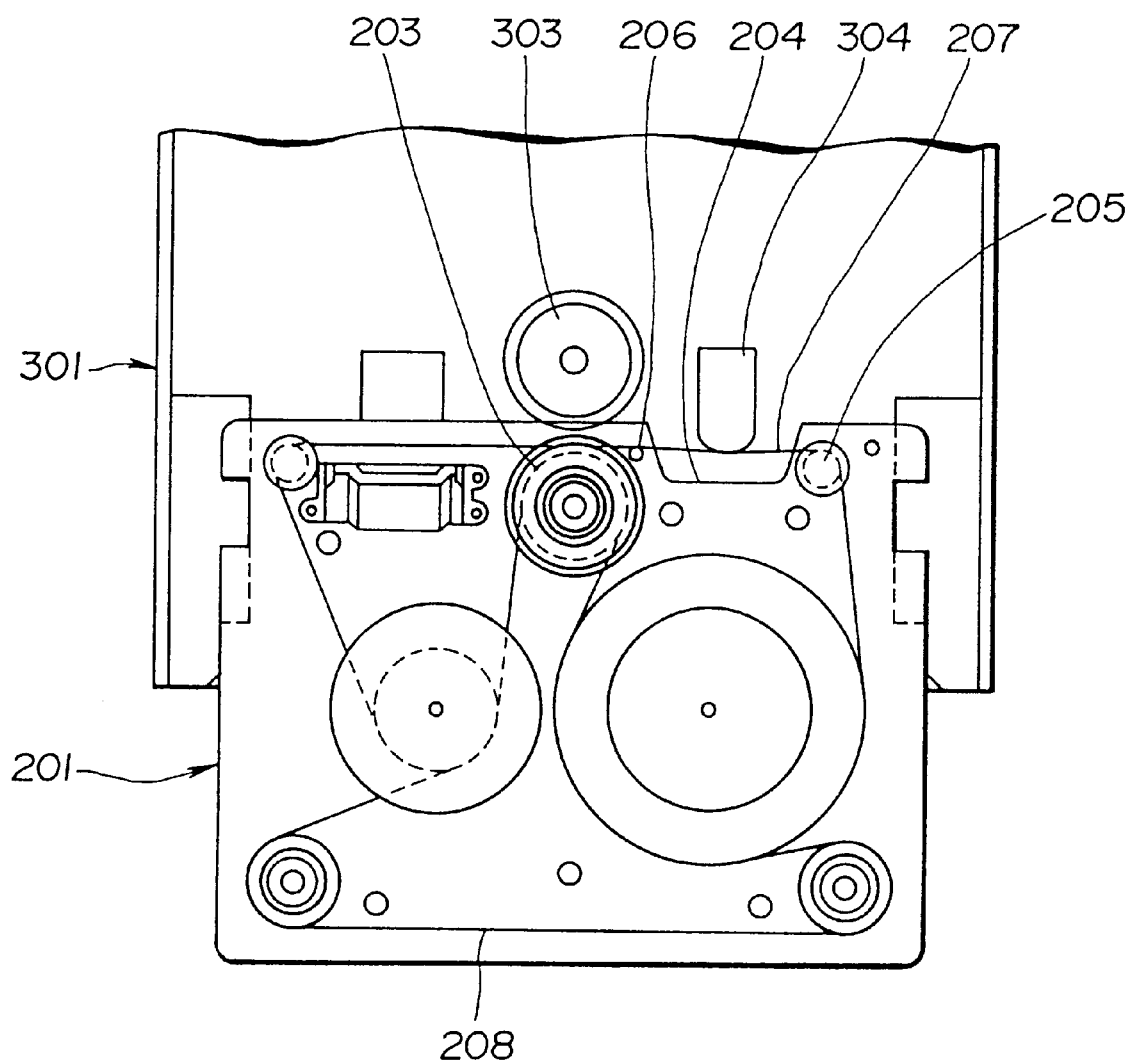
FIG. 13 is a view similar to FIG. 12, showing the known data cartridge loaded in the known reproducing apparatus.

Referring to FIG. 3, the drive capstan roller 112 is disposed in a center position $Cl_2$ of the cartridge compartment 103 as viewed in the cross direction in the same way as the drive capstan roller 303 of the known reproducing apparatus 301 as shown in FIG. 12. For full transmission of a drive force by surely contacting the drive roller 11 of the data cartridge 1 loaded in the cartridge compartment 103, the drive capstan roller 112 is formed to be larger in diameter than the drive capstan roller 303 of the known reproducing apparatus 301 in accordance with the offset amount of the drive roller 11 of the data cartridge 1.

Figure 6:
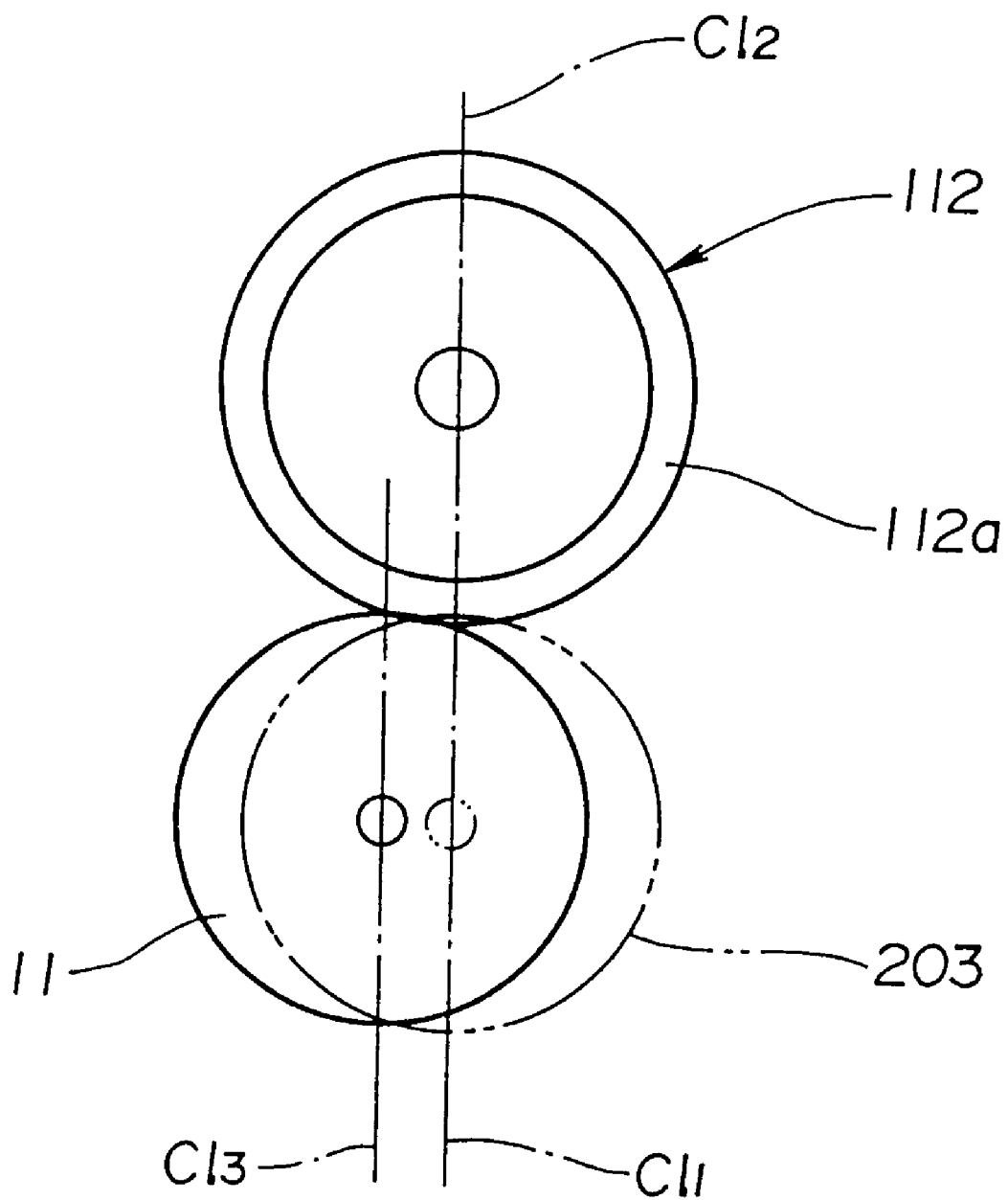
FIG. 6 is a view similar to FIG. 3, showing a drive roller of a known data cartridge and a drive capstan roller of the reproducing apparatus.

The drive capstan roller 112 has an outer periphery made of a resilient material 112a such as rubber and plastic. Referring to FIG. 6, the resilience of the resilient material 112a allows the drive capstan roller 112 to surely contact not only the drive roller 11 of the data cartridge 1 of the present invention, but the drive roller 203 of the known data cartridge 201.

Figure 7:
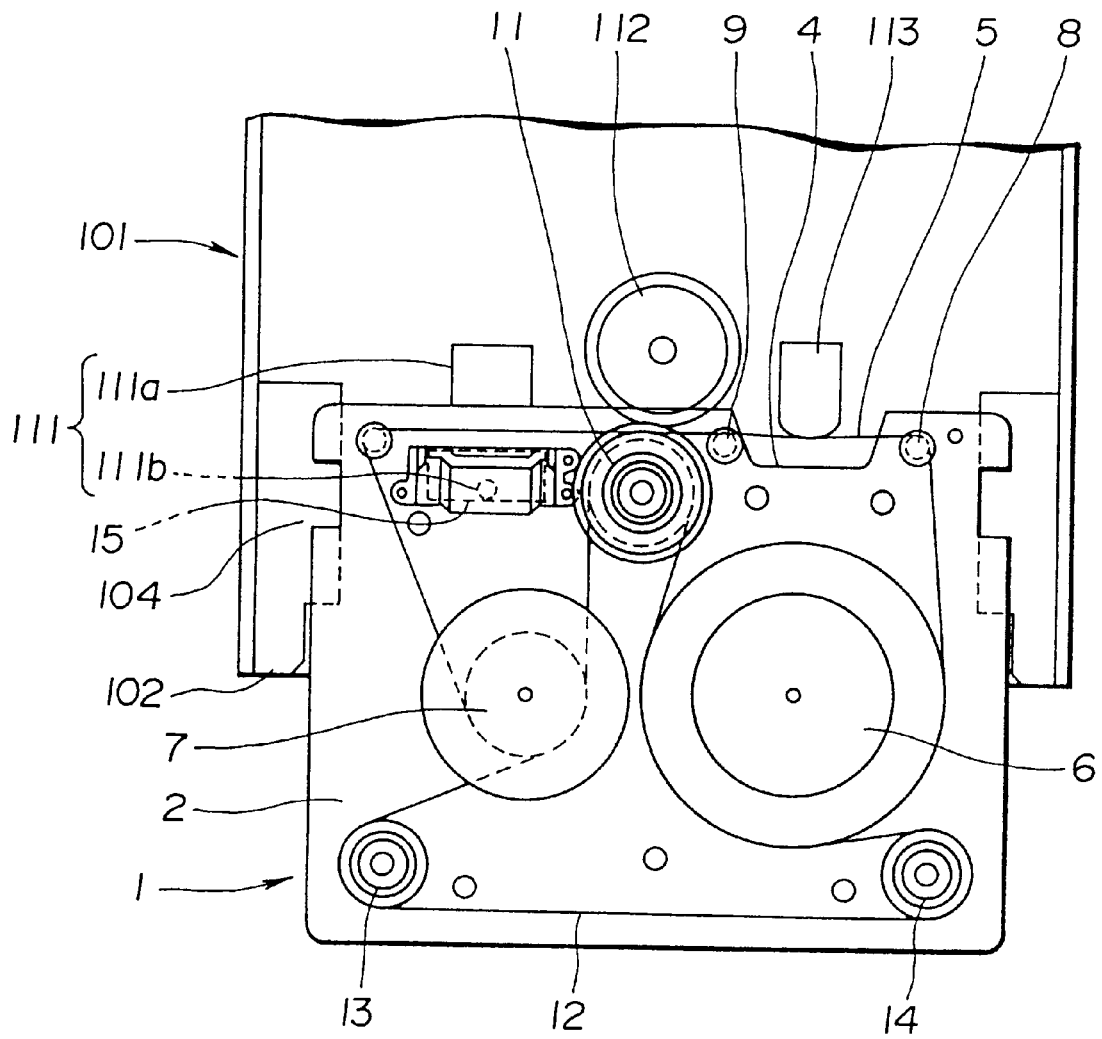
FIG. 7 is a view similar to FIG. 6, showing the data cartridge loaded in the reproducing apparatus.

Next, the operation of the data cartridge 1 and the reproducing apparatus 101 will be described. Referring to FIG. 7, when inserting the data cartridge 1 into the cartridge compartment 103 of the reproducing apparatus 101, the cover opening member, not shown, arranged on one side of the cartridge compartment 103 opens the cover 45, not shown, of the data cartridge 1. The tape-end detecting photosensor 111 arranged on the bottom of the cartridge compartment 103 is positioned to have the light emitter 111b under the light introducing opening 15 of the base plate 2, and the light receiver 111a in front of the tape-end detecting mirror 16. Moreover, the drive capstan roller 112 arranged at the inner end of the cartridge compartment 112 contacts the drive roller 11 of the data cartridge 1, and the magnetic head 113 introduced into the head compartment 41 contacts the magnetic tape 5.

Figure 8:
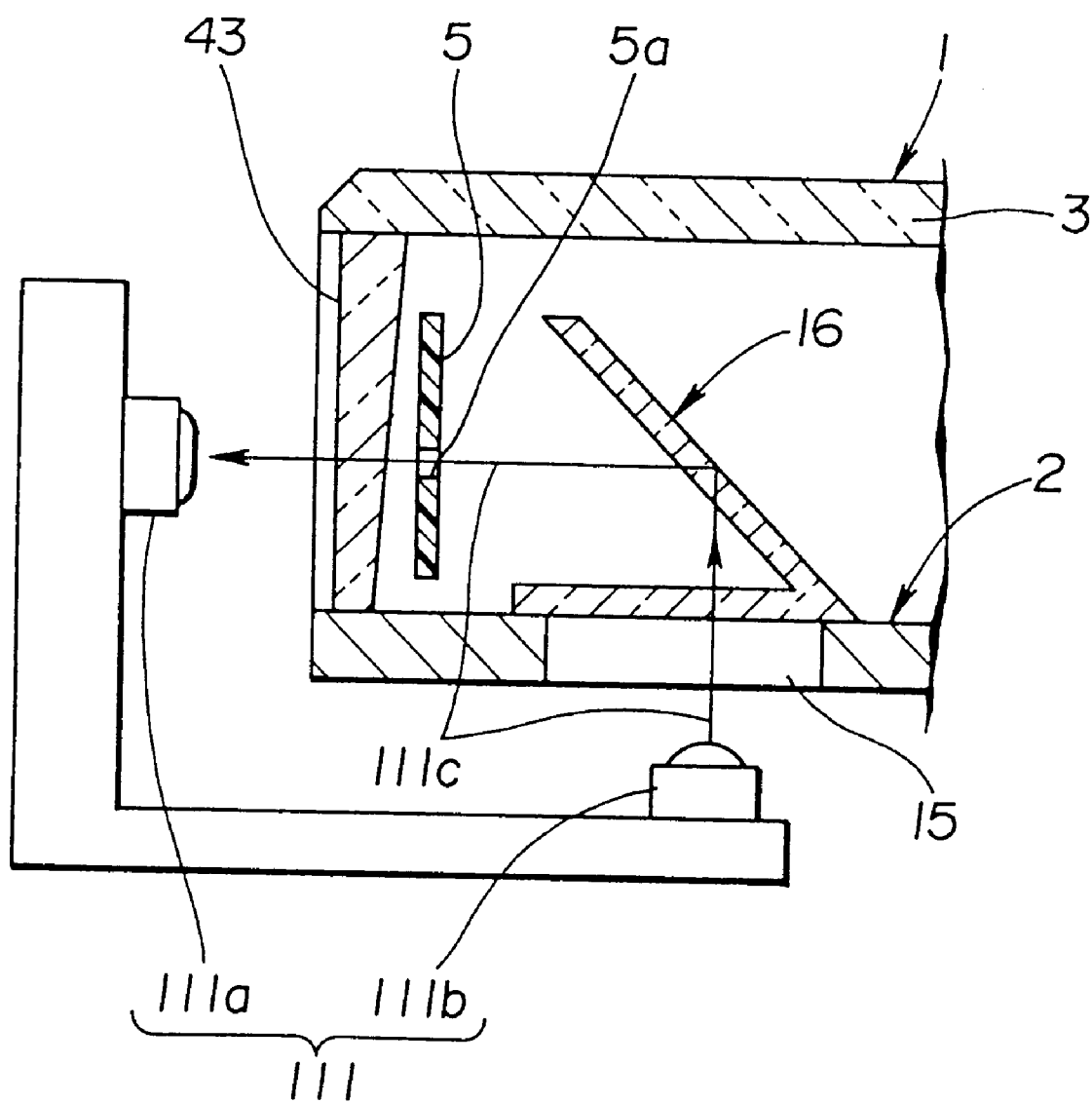
FIG. 8 is a fragmentary section showing the data cartridge loaded in the reproducing apparatus.

Rotation of the drive capstan roller 112 is transmitted to the drive roller 11 to rotate the drive belt 12, running the magnetic tape 5. Referring to FIG. 8, when the magnetic tape 5 runs, and a hole 5a formed therein for detecting start and stop ends, etc. thereof passes in front of the light receiver 111a, the light receiver 111a receives through the hole 5a light 111c emitted from the light emitter 111b and reflected by the mirror 16, detecting the start or stop end, etc. of the magnetic tape 5.

Figure 9:
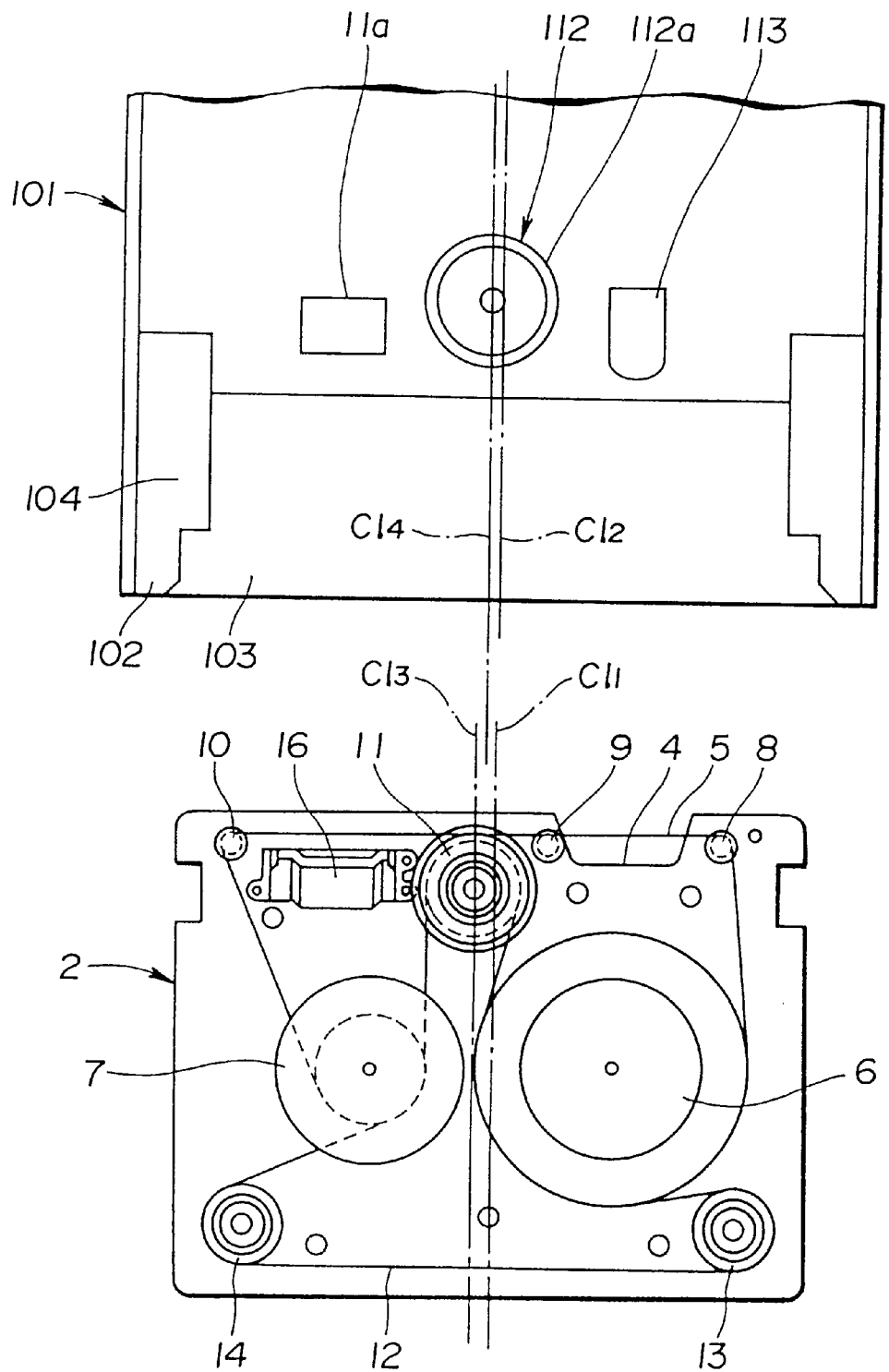
FIG. 9 is a view similar to FIG. 6, showing second embodiment of the present invention.
Figure 10:
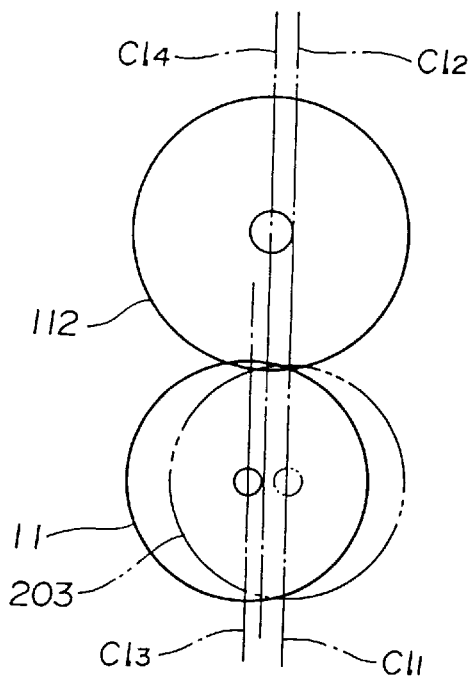
FIG. 10 is a view similar to FIG. 9, showing the drive roller and the drive capstan roller.

FIGS. 9–10 show a second embodiment of the present invention which is substantially the same as the first embodiment except the following point. In the first embodiment, the drive capstan roller 112 of the reproducing apparatus 301 is formed to be larger in diameter than that of the known reproducing apparatus 101, preventing lowering of a drive force of the drive capstan roller 112 with respect to the data cartridge 1 having the drive roller 11 arranged in the position offset. On the other hand, in the second embodiment, referring to FIG. 9, the drive capstan roller 112 is arranged in a position offset to the light receiver 112a of the photosensor 112 with respect to the center position $Cl_2$ of the cartridge compartment 103, preventing lowering of a drive force of the drive capstan roller 112 with respect to the data cartridge 1 having the drive roller 11 arranged in the position offset.

Referring to FIG. 10, the drive capstan roller 112 is arranged in an offset position $Cl_4$ between the position $Cl_1$ of the drive roller 203 of the known data cartridge 201 and the position $Cl_3$ of the drive roller 11 of the data cartridge 1 of the present invention, enabling uniform application of a drive force not only to the known data cartridge 201, but to the data cartridge 1 of the present invention.

Figure 11:
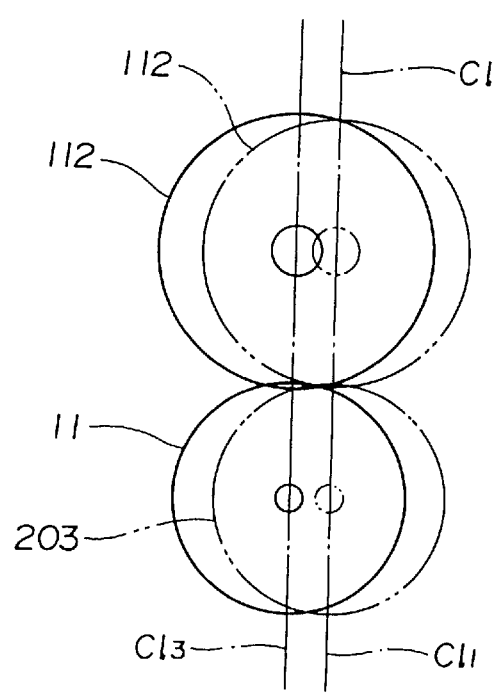
FIG. 11 is a view similar to FIG. 10, showing a third embodiment of the present invention.

Referring to FIG. 11, a position mover, not shown, may be arranged to move the drive capstan roller 112 of the reproducing apparatus 101 so that, when inserting the known data cartridge 201 into the cartridge compartment 103, the drive capstan roller 112 is moved to the position $Cl_1$ of the drive roller 203 of the data cartridge 201 as indicated by fully-drawn line so as to make the drive roller 203 and the drive capstan roller 112 contact each other with rotation axes aligned in the cartridge inserting direction; and when inserting the data cartridge 1 of the present invention into the cartridge compartment 103, the drive capstan roller 112 is moved to the position $Cl_3$ of the drive roller 11 of the data cartridge 1 as indicated by two-dot chain line so as to make the drive roller 11 and the drive capstan roller 112 contact each other with rotation axes aligned in the cartridge inserting direction.

What is claimed is:

1. A belt-drive tape cartridge usable with a reproducing apparatus, said tape cartridge comprising:

a base plate, said base plate having a recess for receiving a magnetic head, said base plate having a center position ($Cl_1$) as viewed in a cross direction thereof;

tape guides arranged on both sides of said recess, each tape guide including flanges formed at both ends thereof; and a drive roller positioned adjacent to one of said tape guides arranged to be offset by an offset amount ($Cl_3$) with respect to said center position ($Cl_1$) of said base plate in a direction away from said adjacent tape guide adjacent the drive roller whereby said flanges of said adjacent tape guide adjacent the drive roller are not in contact with said drive roller.

2. The tape cartridge as claimed in claim 1, wherein said drive roller is adapted to engage a drive capstan roller having a diameter increased in accordance with said offset amount of the drive roller of the tape cartridge with respect to the center position of the base plate thereof.

3. The tape cartridge as claimed in claim 2, wherein said diameter of said capstan roller is increased due to a resilient member being disposed around said capstan roller.

4. The tape cartridge as claimed in claim 1, wherein said drive roller is adapted to engage a drive capstan roller offset in accordance with said offset amount of the drive roller of the tape cartridge with respect to the center position of the base plate thereof.

5. The tape cartridge as claimed in claim 1, wherein said drive roller is adapted to engage a drive capstan roller having an offset means for offsetting said drive capstan roller with said offset amount of the drive roller of the tape cartridge with respect to the center position of the base plate thereof.

* * * * *

UNITED STATES PATENT AND TRADEMARK OFFICE
CERTIFICATE OF CORRECTION

| | |
|---|---|
| PATENT NO. | : 6,018,445 |
| APPLICATION NO. | : 08/882269 |
| DATED | : January 25, 2000 |
| INVENTOR(S) | : Meguro et al. |

It is certified that error appears in the above-identified patent and that said Letters Patent is hereby corrected as shown below:

Column 6, line 12 et seq., claim 1, line 1, should read;

1.) A belt-drive tape cartridge usable with a reproducing apparatus, said tape cartridge comprising:

a base plate, said base plate having a recess for receiving a magnetic head, said base plate having a center position ($Cl_1$) as viewed in a cross direction thereof;

tape guides arranged on both sides of said recess, each tape guide including flanges formed at both ends thereof; and a drive roller positioned adjacent to one of said tape guides arranged to be offset by an offset amount ($Cl_3$) with respect to said center position ($Cl_1$) of said base plate in a direction away from said tape guide adjacent the drive roller whereby said flanges of said tape guide adjacent the drive roller are not in contact with said drive roller.

Signed and Sealed this

Twenty-first Day of August, 2007

JON W. DUDAS
*Director of the United States Patent and Trademark Office*